US011960917B2

(12) United States Patent
Yadlapati et al.

(10) Patent No.: US 11,960,917 B2
(45) Date of Patent: Apr. 16, 2024

(54) LIVE MIGRATION AND REDUNDANCY FOR VIRTUALIZED STORAGE

(71) Applicant: International Business Machines Corporation, Armonk, NY (US)

(72) Inventors: Lakshmi Yadlapati, Austin, TX (US); Veena Ganti, Austin, TX (US); Rui Yang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 491 days.

(21) Appl. No.: 17/346,439

(22) Filed: Jun. 14, 2021

(65) Prior Publication Data

US 2022/0398114 A1 Dec. 15, 2022

(51) Int. Cl.
*G06F 9/455* (2018.01)

(52) U.S. Cl.
CPC .............. *G06F 9/45558* (2013.01); *G06F 2009/45579* (2013.01)

(58) Field of Classification Search
CPC ............ G06F 9/45558; G06F 2009/45579
See application file for complete search history.

(56) References Cited

U.S. PATENT DOCUMENTS

| 7,743,107 | B2 | 6/2010 | Kovacs et al. |
| 8,019,966 | B2 | 9/2011 | Nevarez et al. |
| 8,458,413 | B2 | 6/2013 | Ganti et al. |
| 8,726,274 | B2 | 5/2014 | Pafumi et al. |
| 8,949,188 | B2 | 2/2015 | Pafumi et al. |
| 8,996,477 | B2 | 3/2015 | Mewhinney et al. |
| 9,031,917 | B2 | 5/2015 | Pafumi et al. |
| 10,921,993 | B2 | 2/2021 | Anumula et al. |
| 2012/0272238 | A1 | 10/2012 | Baron |
| 2013/0254762 | A1 | 9/2013 | Cochran |
| 2015/0012973 | A1 | 1/2015 | Derrin et al. |

OTHER PUBLICATIONS

International Searching Authority, PCT/CN2022/097787, dated Aug. 19, 2022.

*Primary Examiner* — Gregory A Kessler
(74) *Attorney, Agent, or Firm* — Garg Law Firm, PLLC; Rakesh Garg; Nathan Rau

(57) ABSTRACT

For a first server virtual machine (VM) virtualizing a logical volume in a read/write mode for a client VM, a second server VM virtualizing the logical volume in an off mode is instantiated. The logical volume comprises a virtualization of a portion of physical storage. At the first server VM, the logical volume is deactivated, the deactivating disallowing the first server VM from performing a storage request from the client VM. At the second server VM, the logical volume is activated, the activating performed by causing the second VM to virtualize the logical volume in the read/write mode, the activating allowing the second server VM to perform the storage request.

20 Claims, 9 Drawing Sheets ated storage, and one or more computer-
readable storage devices, and program instructions stored on
at least one of the one or more storage devices for execution
by at least one of the one or more processors via at least one
of the one or more memories.

LIVE MIGRATION AND REDUNDANCY FOR VIRTUALIZED STORAGE

BACKGROUND

The present invention relates generally to a method, system, and computer program product for virtualized storage. More particularly, the present invention relates to a method, system, and computer program product for live migration and redundancy for virtualized storage.

A virtual machine (VM) is computer software that emulates the physical components of a computer system. A hypervisor is software that manages one or more virtual machines executing on one physical computer system or host. A VM emulates, or virtualizes, physical components of the host, such as processors, memory, and input/output resources for storage, network, and other peripherals, so that to an operating system executing on the VM a virtual component behaves the same as the corresponding physical component. In some systems, management software, for example a Hardware Management Console, is additional software that configures and manages VMs and hypervisors.

In one configuration, each VM has its own set of virtualized resources, such as virtualized versions of a physical storage device. In another configuration, instead of each VM having its own set of virtualized resources, one VM, called a server VM, is designated to virtualize some or all resources in the system, such as virtualized versions of a physical storage device, for a set of client VMs. In some systems, a server VM is also called a virtual input/output (VIO) server or VIOS.

The virtualized storage is also called a logical volume. Using virtualized storage, multiple client VMs can share the same physical storage device, allowing more efficient utilization of physical storage space as well as easier configuration, maintenance, and adjustment to changing storage needs.

In some systems, multiple server VMs virtualizing the same physical storage are called a concurrent volume group or an enhanced concurrent volume group. For example, in the AIX operating system, a Concurrent Logical Volume Manager (CLVM) coordinates logical volume usage through the Group Services component of the Reliable Scalable Cluster Technology (RSCT) function.

SUMMARY

The illustrative embodiments provide a method, system, and computer program product. An embodiment includes a method that instantiates, for a first server virtual machine (VM) virtualizing a logical volume in a read/write mode for a client VM, a second server VM virtualizing the logical volume in an off mode, the logical volume comprising a virtualization of a portion of physical storage. An embodiment deactivates, at the first server VM, the logical volume, the deactivating disallowing the first server VM from performing a storage request from the client VM. An embodiment activates, at the second server VM, the logical volume, the activating performed by causing the second VM to virtualize the logical volume in the read/write mode, the activating allowing the second server VM to perform the storage request.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
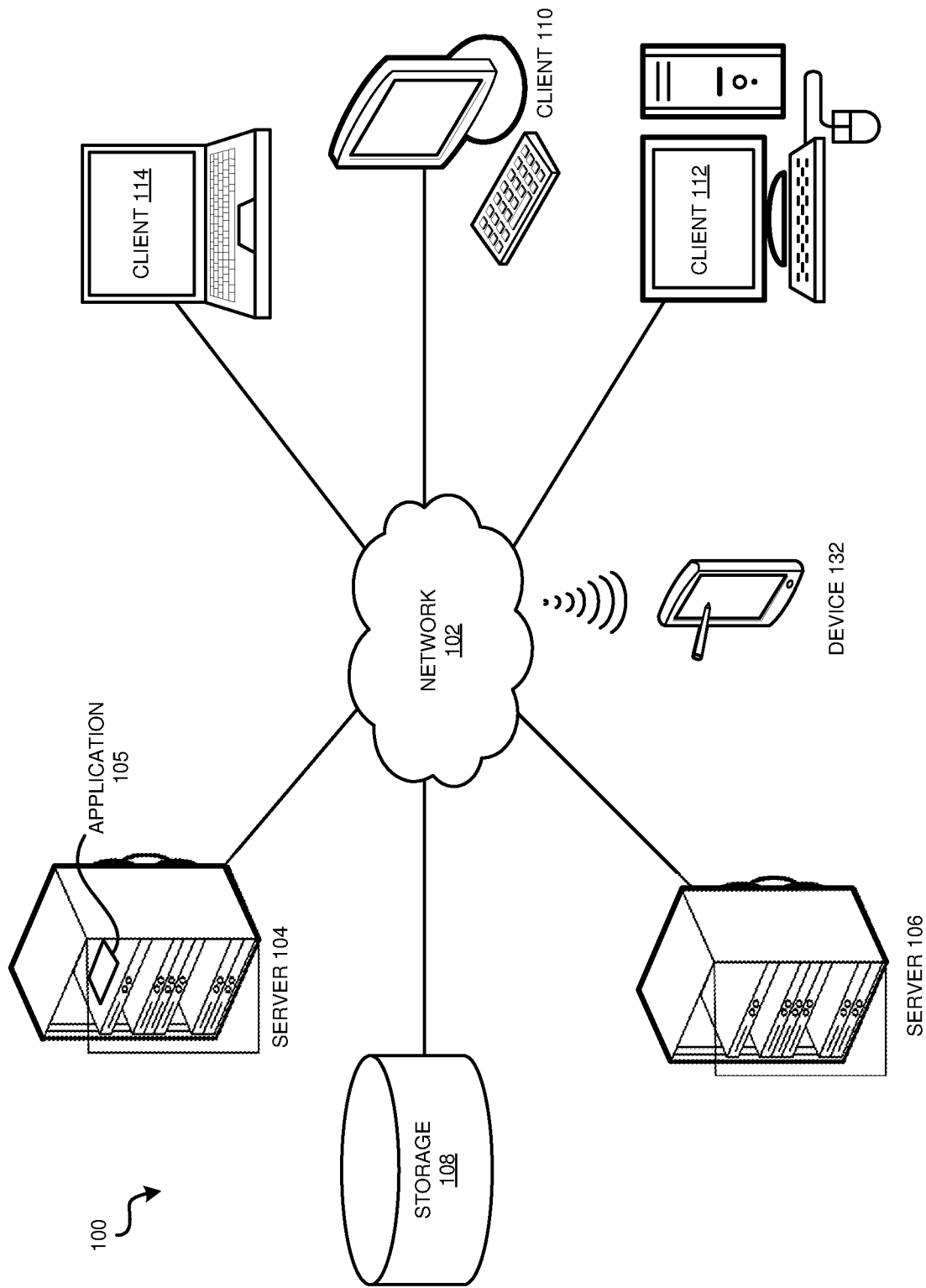
FIG. 1 depicts a block diagram of a network of data processing systems in which illustrative embodiments may be implemented.

The illustrative embodiments recognize that migrating server VMs, and the resources they virtualize, is often necessary to update VM software, reconfigure the physical resources being virtualized, respond to changing resource utilizations and available physical resources, and for other reasons. Live migration, in which a client VM using a virtualized resource is unaware of the migration or experiences minimal service interruption during the migration, is also desirable.

The illustrative embodiments also recognize that redundancy in virtualized resources is desirable, to prevent or minimize disruption to a client VM using a virtualized resource if the resource being virtualized or the server VM performing the virtualization fails. Redundancy, once implemented, is also usable as part of a live migration implementation.

The illustrative embodiments also recognize that, although physical storage redundancy is available, redundancy of virtual storage and live migration of server VMs virtualizing storage are not currently available for some hypervisor and VM implementations. For example, the PowerVM hypervisor does not provide storage redundancy for client VMs using logical volumes provided by a VIOS, and does not support live migration of client VMs using logical volumes. (PowerVM is a registered trademark of International Business Machines Corporation in the United States and other countries.) In addition, in some environments two VIOSes could be unaware that they are virtualizing the same underlying physical storage and overwrite each other's data.

Thus, the illustrative embodiments recognize that there is an unmet need for storage virtualization that avoids data corruption and provides a live migration and redundancy capability for a server VM, and the resources it virtualizes.

The illustrative embodiments recognize that the presently available tools or solutions do not address these needs or provide adequate solutions for these needs. The illustrative embodiments used to describe the invention generally address and solve the above-described problems and other problems related to live migration and redundancy for virtualized storage.

An embodiment can be implemented as a software application. The application implementing an embodiment can be configured as a modification of an existing VM management system such as a Hardware Management Console (HMC) implementation, as a separate application that operates in conjunction with an existing VM management system, a standalone application, or some combination thereof.

Particularly, some illustrative embodiments provide a method that instantiates, for a first server VM virtualizing a logical volume in a read/write mode, a second server VM. The method deactivates the logical volume at the first server VM and activates the logical volume at the second server VM, allowing the logical volume to perform the storage request.

An embodiment starts with a source server VM to be live migrated, or to have virtual storage redundancy implemented. The source server VM is executing on a physical machine and providing a logical volume, a virtualized portion of a physical storage device, for use by a client VM. The physical storage device is installed in the physical machine or accessible via a network. The source server VM virtualizes the logical volume in a read/write mode, in which the server VM allows both read and write requests from a client VM to pass through to the physical storage being virtualized. In addition to the read/write mode, a server VM also has two other storage virtualization modes: an off mode and a read-only mode. In the off mode, a server VM does not pass read and write requests from a client VM to the underlying physical storage. In the read-only mode, a server VM allows read requests from a client VM, but does not pass write requests to the physical storage being virtualized.

An embodiment instantiates a second, target, server VM virtualizing the same logical volume as the source server VM. Because the logical volumes are the same, both source and target server VMs are virtualizing the same portion of a physical storage device. However, at instantiation the target server VM virtualizes the logical volume in the off mode. Techniques for instantiating a server VM and virtualizing a logical volume are presently known. In one embodiment, the target server VM executes in the same physical machine as the source server VM. In another embodiment, the target and source server VMs execute in different physical machines.

An embodiment deactivates virtualization of the logical volume at the source server VM and activates virtualization of the logical volume at the target server VM. If a migration is being performed, an embodiment deactivates logical volume virtualization by causing the source server VM to virtualize the logical volume in the off mode. To activate virtualization of the logical volume, an embodiment causes the target server VM to virtualize the logical volume in the read/write mode. Because two VMs both virtualize the same physical storage could overwrite each other's data, an embodiment controls deactivation and activation sequencing so that only one server VM is virtualizing storage in read/write mode at a time, or causes write requests from client VMs to be held until only one server VM is virtualizing storage in read/write mode. At this point, the target server VM is capable of responding to client VM requests, and the migration is complete. Once the migration is complete, the source server VM logical volume can be deactivated from virtualizing the storage using a presently available technique, or the source server VM itself can be removed using a presently available technique.

If redundancy is being implemented, an embodiment deactivates logical volume virtualization by causing the source server VM to virtualize the logical volume in the read-only mode. An embodiment also causes the target server VM to virtualize the logical volume in the read/write mode. At this point, the target server VM can both read from and write to the physical storage, and the source server VM can only read from the physical storage. Thus, the source server VM provides redundancy for the target server VM. If the server VM in read/write mode should later fail, techniques presently exist to detect the failure and cause the server VM in read-only mode to enter read/write mode. Because two VMs both virtualize the same physical storage could overwrite each other's data, an embodiment controls deactivation and activation sequencing so that only one server VM is virtualizing storage in read/write mode at a time, or causes write requests from client VMs to be held until only one server VM is virtualizing storage in read/write mode.

A redundant configuration is also usable to serve multiple client VMs, while keeping the client VMs' data separate. In particular, an embodiment configures two server VMs, both using a logical volume to virtualize the same portion of a physical storage device for a first client VM. Both server VMs also use a second logical volume to virtualize a second portion of a physical storage device for a second client VM. One server VM virtualizes both logical volumes in read-only mode, and the other server VM virtualizes both logical volumes in read/write mode. Thus, the two server VMs provide virtual storage redundancy, but the two client VMs' data is kept separate.

The manner of live migration and redundancy for virtualized storage described herein is unavailable in the presently available methods in the technological field of endeavor pertaining to management of virtualized resources. A method of an embodiment described herein, when implemented to execute on a device or data processing system, comprises substantial advancement of the functionality of that device or data processing system in instantiates, for a first server VM virtualizing a logical volume in a read/write mode, a second server VM. The method deactivates the logical volume at the first server VM and activates the logical volume at the second server VM, allowing the logical volume to perform the storage request.

The illustrative embodiments are described with respect to certain types of physical storage, virtual storage, logical volumes, server VMs, client VMs, modes, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
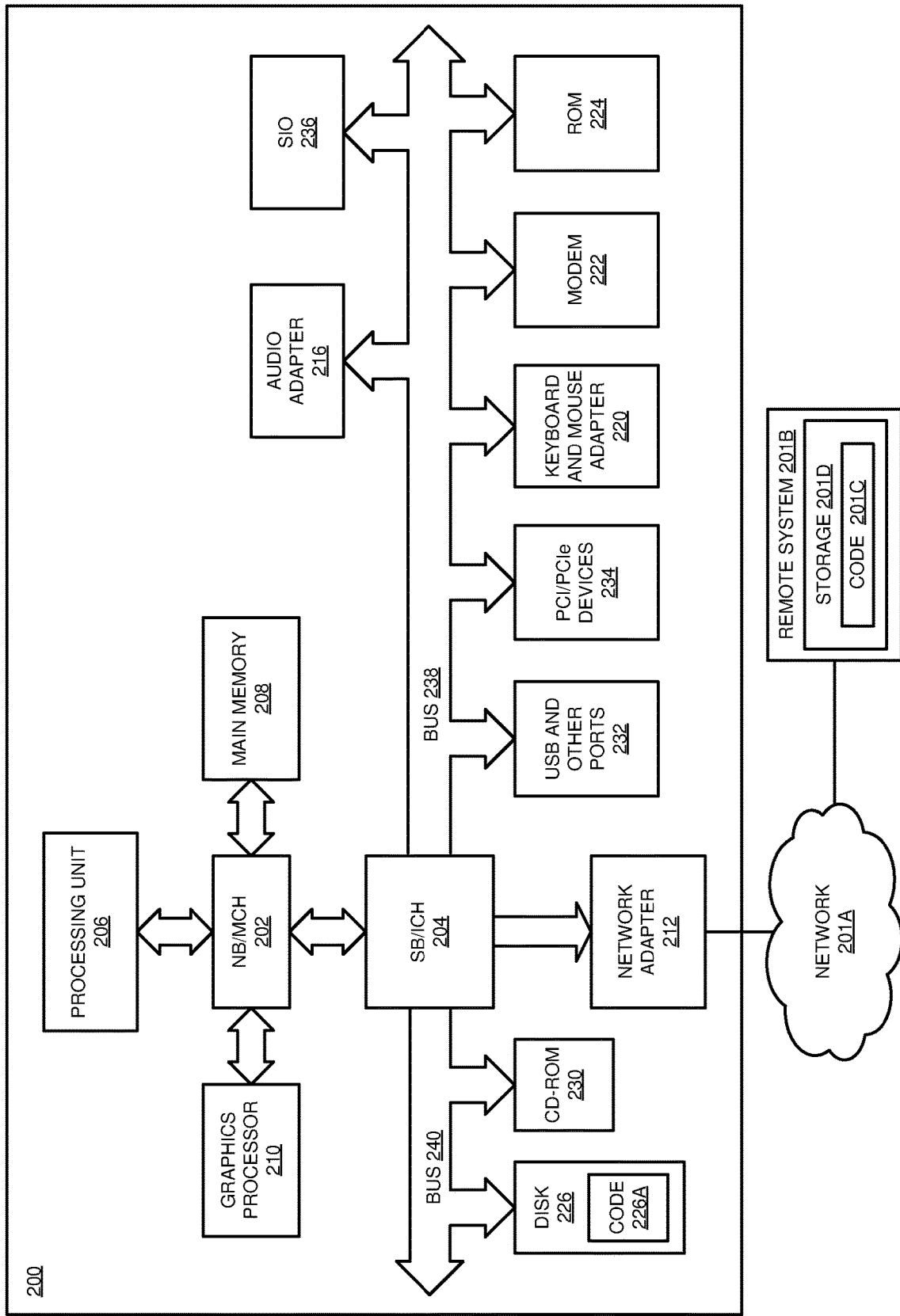
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. The shared physical storage can be storage unit 108, or installed in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
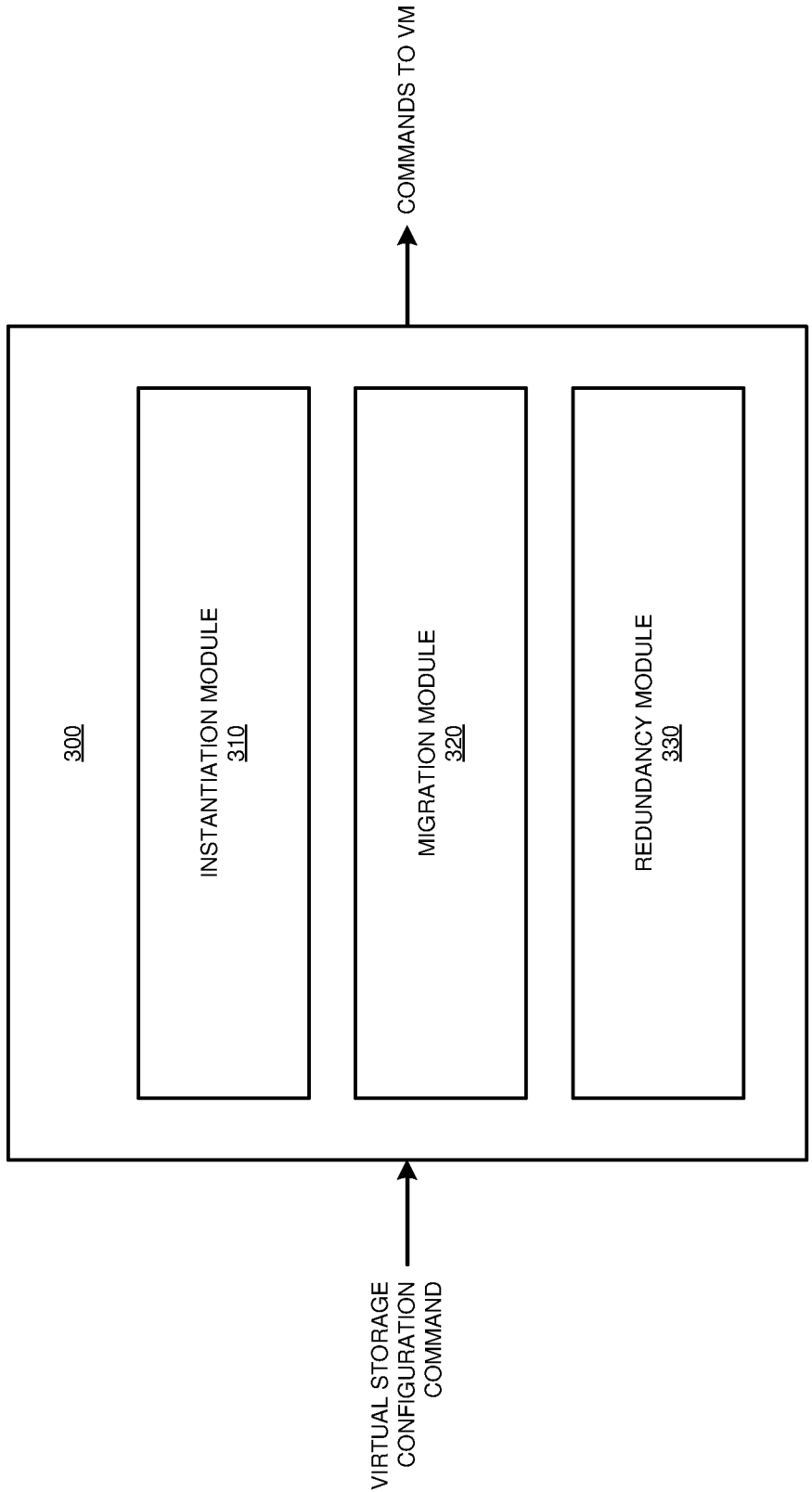
FIG. 3 depicts a block diagram of an example configuration for live migration and redundancy for virtualized storage in accordance with an illustrative embodiment.

With reference to FIG. 3, this figure depicts a block diagram of an example configuration for live migration and redundancy for virtualized storage in accordance with an illustrative embodiment. Application 300 is an example of application 105 in FIG. 1 and executes in any of servers 104 and 106, clients 110, 112, and 114, and device 132 in FIG. 1.

Application 300 starts with a source server VM to be live migrated, or to have virtual storage redundancy implemented. The source server VM is executing on a physical machine and providing a logical volume, a virtualized portion of a physical storage device, for use by a client VM. The physical storage device is installed in the physical machine or accessible via a network. The source server VM virtualizes the logical volume in a read/write mode.

Instantiation module 310 An embodiment instantiates a second, target, server VM virtualizing the same logical volume as the source server VM. Because the logical volumes are the same, both source and target server VMs are virtualizing the same portion of a physical storage device.

However, at instantiation the target server VM virtualizes the logical volume in the off mode.

If application 300 receives a command to perform a migration, migration module 320 deactivates logical volume virtualization by causing the source server VM to virtualize the logical volume in the off mode. To activate virtualization of the logical volume, module 320 causes the target server VM to virtualize the logical volume in the read/write mode. Because two VMs both virtualize the same physical storage could overwrite each other's data, module 320 controls deactivation and activation sequencing so that only one server VM is virtualizing storage in read/write mode at a time, or causes write requests from client VMs to be held until only one server VM is virtualizing storage in read/write mode. At this point, the target server VM is capable of responding to client VM requests, and the migration is complete. Once the migration is complete, the source server VM logical volume can be deactivated from virtualizing the storage, or the source server VM itself can be removed.

If application 300 receives a command to implement redundancy, redundancy module 330 deactivates logical volume virtualization by causing the source server VM to virtualize the logical volume in the read-only mode. Module 330 also causes the target server VM to virtualize the logical volume in the read/write mode. At this point, the target server VM can both read from and write to the physical storage, and the source server VM can only read from the physical storage. Thus, the source server VM provides redundancy for the target server VM. Because two VMs both virtualize the same physical storage could overwrite each other's data, module 330 controls deactivation and activation sequencing so that only one server VM is virtualizing storage in read/write mode at a time, or causes write requests from client VMs to be held until only one server VM is virtualizing storage in read/write mode.

Figure 4:
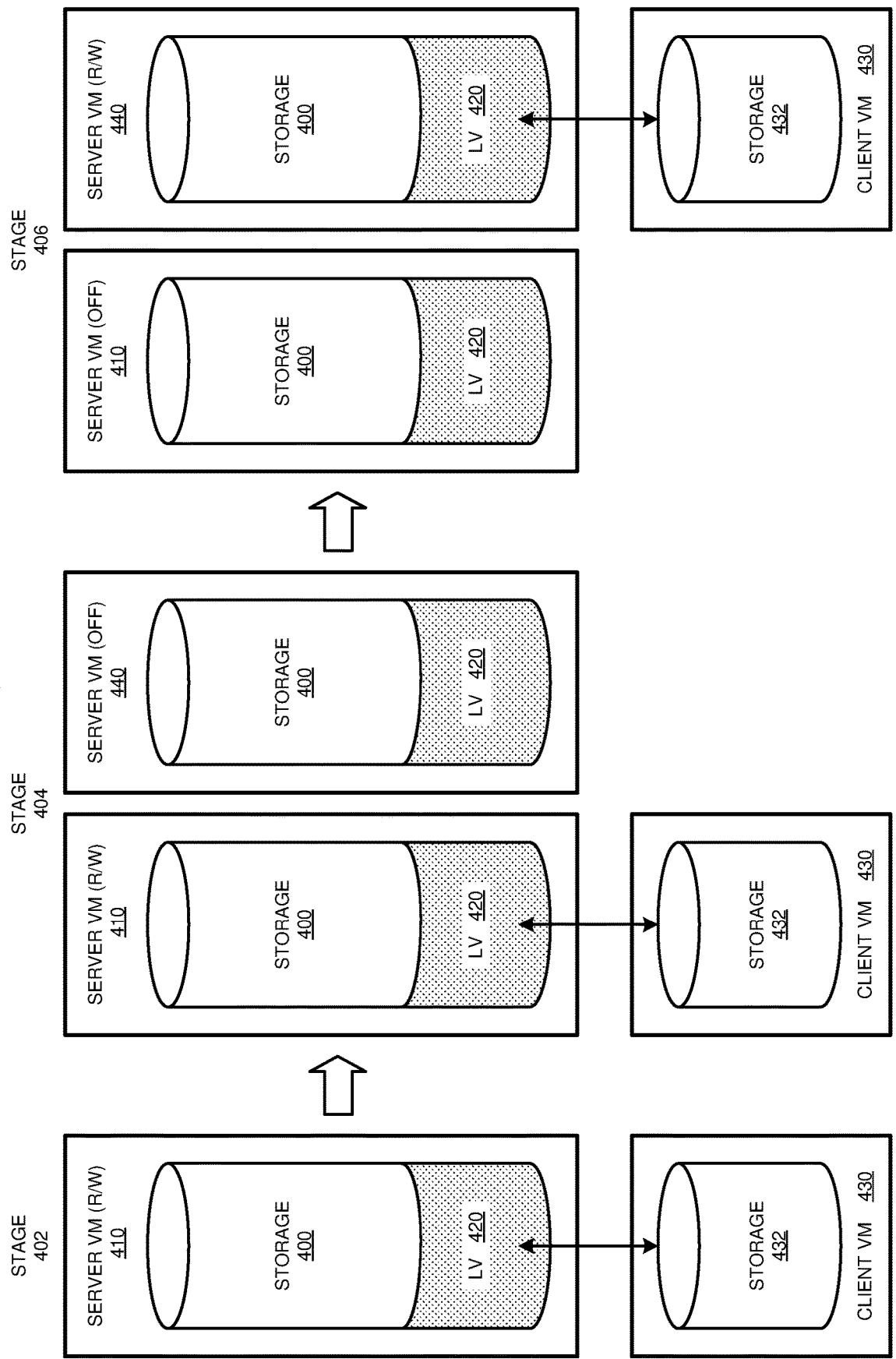
FIG. 4 depicts an example of live migration and redundancy for virtualized storage in accordance with an illustrative embodiment.

With reference to FIG. 4, this figure depicts an example of live migration and redundancy for virtualized storage in accordance with an illustrative embodiment. The example can be executed using application 300 in FIG. 3.

In stage 402, server VM 410 is a source server VM to be live migrated. VM 410 is executing on a physical machine and virtualizing logical volume (LV) 420, a virtualized portion of storage 400, for use by client VM 430. LV 420 appears to client 430 as storage 432. VM 410 virtualizes LV 420 in a read/write mode.

In stage 404, server VM 440, a target server VM, has been instantiated and is also virtualizing LV 420. Server VM 440 is virtualizing LV 420 in the off mode, and storage requests from client VM 430 are still being serviced by server VM 410.

In stage 406, because a migration is being performed, application 300 deactivates server VM 410's virtualization of LV 420 by causing server VM 410 to virtualize LV 420 in the off mode. Application 300 activates server VM 440's virtualization of LV 420 by causing server VM 440 to virtualize LV 420 in the read/write mode. At this point, server VM 440 is capable of responding to client VM 430's storage requests, and the migration is complete.

Figure 5:
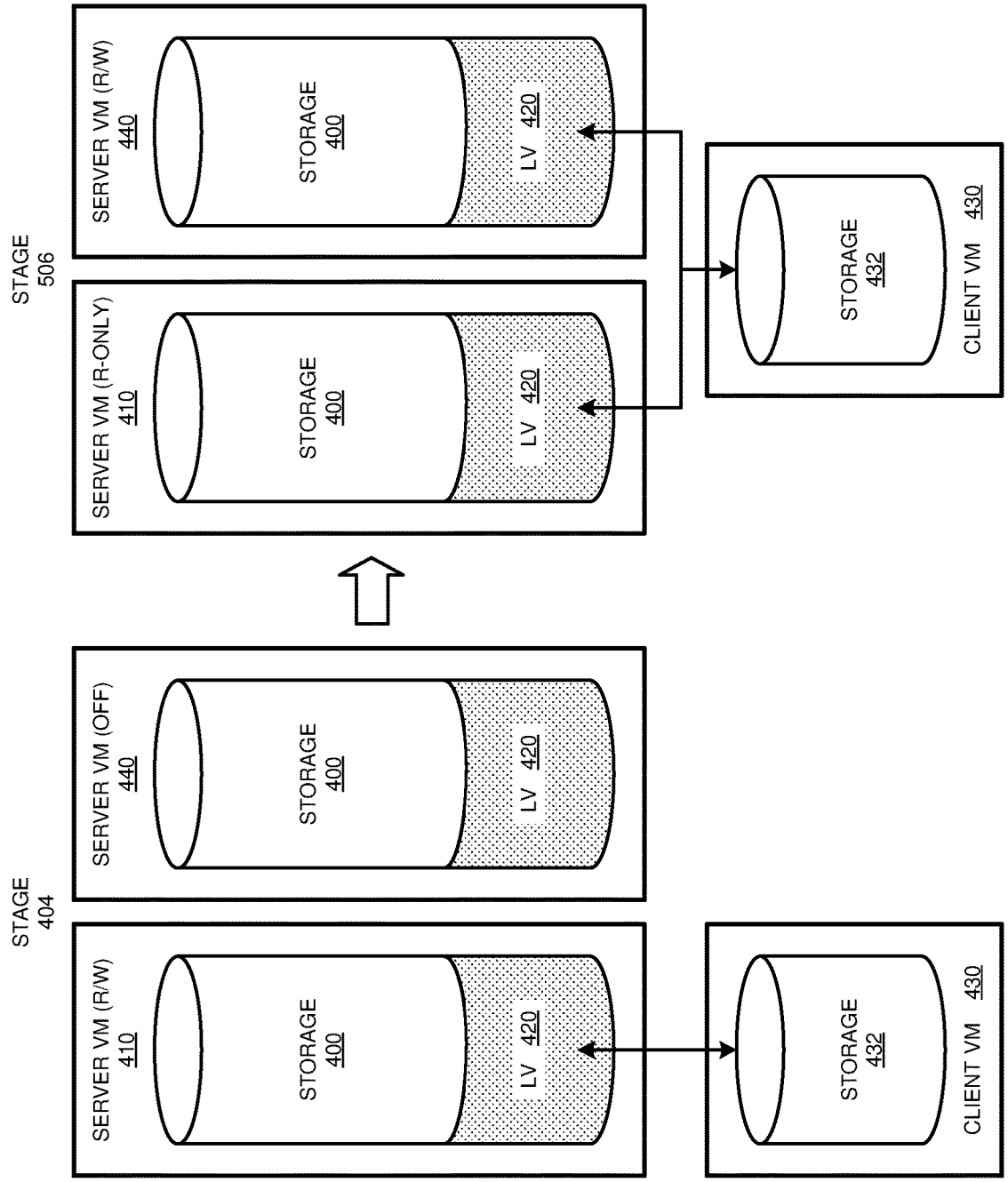
FIG. 5 depicts a continued example of live migration and redundancy for virtualized storage in accordance with an illustrative embodiment.

With reference to FIG. 5, this figure depicts a continued example of live migration and redundancy for virtualized storage in accordance with an illustrative embodiment. Storage 400, stage 404, server VMs 410 and 440, LV 420, client VM 430, and storage 432 are the same as storage 400, stage 404, server VMs 410 and 440, LV 420, client VM 430, and storage 432 in FIG. 4.

In stage 506, because redundancy is being implemented, application 300 deactivates logical volume virtualization by causing server VM 410 to virtualize LV 420 in the read-only mode. Application 300 also causes server VM 440 to virtualize LV 420 in the read/write mode. At this point, server VM 440 can both read from and write to storage 400, but server VM 410 can only read from storage 400. Thus, server VM 410 provides redundancy for server VM 440.

Figure 6:
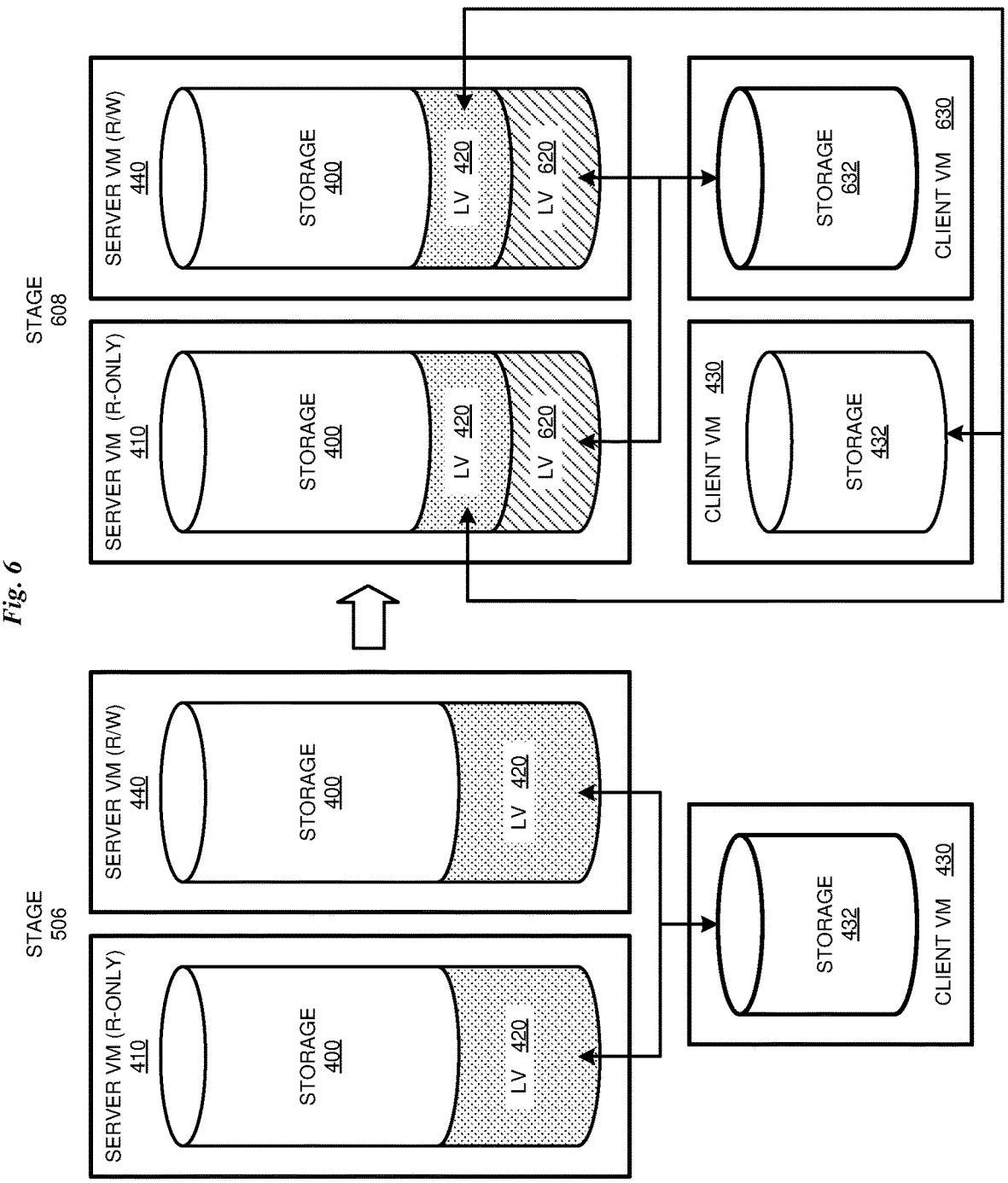
FIG. 6 depicts a continued example of live migration and redundancy for virtualized storage in accordance with an illustrative embodiment.

With reference to FIG. 6, this figure depicts a continued example of live migration and redundancy for virtualized storage in accordance with an illustrative embodiment. Storage 400, server VMs 410 and 440, LV 420, client VM 430, and storage 432 are the same as storage 400, server VMs 410 and 440, LV 420, client VM 430, and storage 432 in FIG. 4. Stage 506 is the same as stage 506 in FIG. 5.

In particular, FIG. 6 depicts a redundant configuration serving multiple clients, while keeping the clients' data separate. In particular, stage 506 depicts VMs 410 and 440 using LV 420 to virtualize a first portion of storage 400 for client VM 430. Server VM 410 is virtualizing LV 420 in read-only mode, providing redundancy for client VM 430, and server VM 440 is virtualizing LV 420 in read/write mode, responding to client VM 430's storage requests.

In stage 608, server VM 410 and server VM 440 are also using LV 620 to virtualize a second portion of storage 400 for client VM 630's storage 632 has been configured, virtualizing a second portion of storage 400. Server VM 410 is virtualizing LV 620 in read-only mode and server VM 440 is virtualizing LV 620 in read/write mode. Thus, the two server VMs provide virtual storage redundancy, but the two client VMs' data is kept separate.

Figure 7:
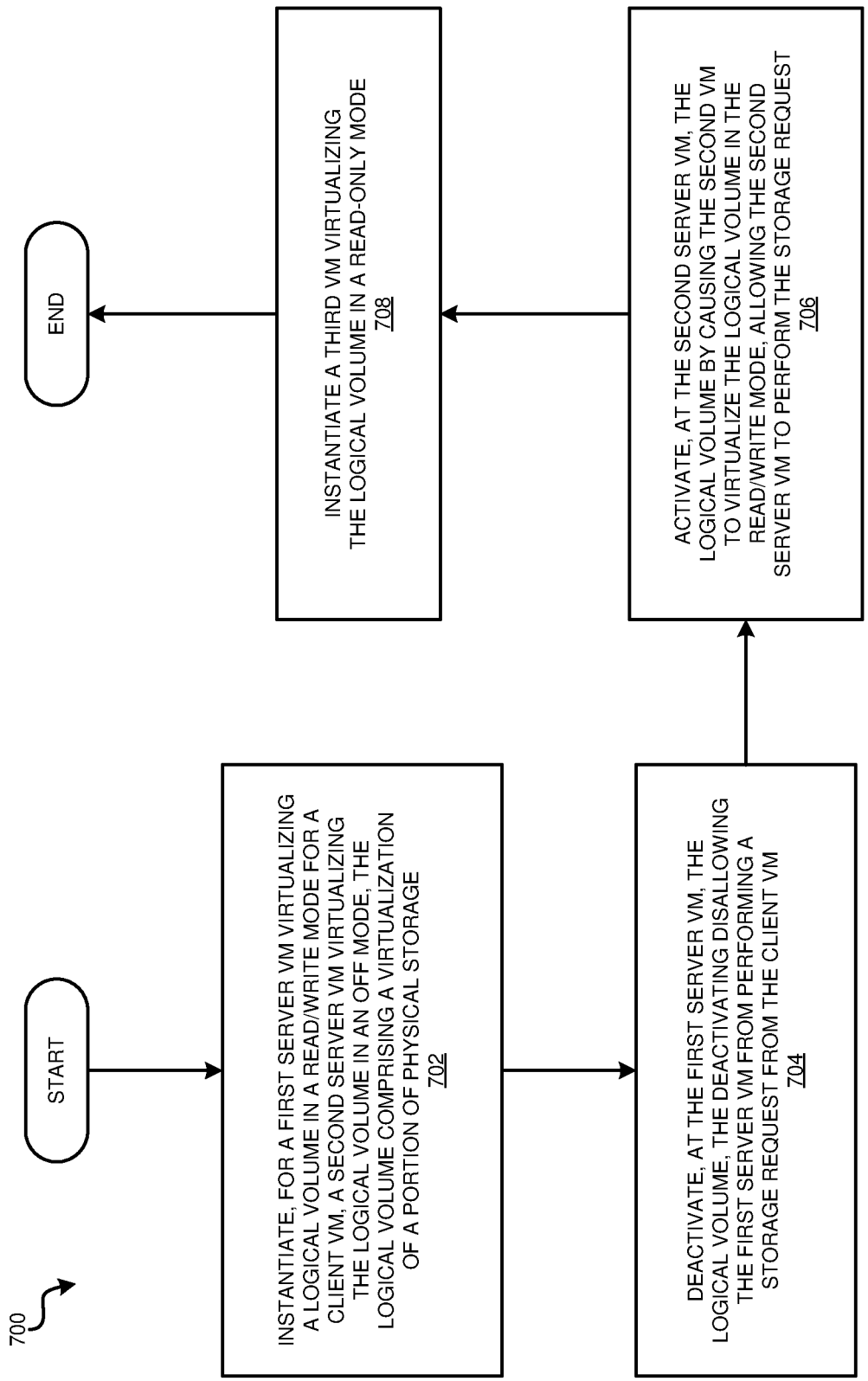
FIG. 7 depicts a flowchart of an example process for live migration and redundancy for virtualized storage in accordance with an illustrative embodiment.

With reference to FIG. 7, this figure depicts a flowchart of an example process for live migration and redundancy for virtualized storage in accordance with an illustrative embodiment. Process 700 can be implemented in application 300 in FIG. 3.

In block 702, the application instantiates, for a first server VM virtualizing a logical volume in a read/write mode for a client VM, a second server VM virtualizing the logical volume in an off mode, the logical volume comprising a virtualization of a portion of physical storage. In block 704, the application deactivates, at the first server VM, the logical volume, the deactivating disallowing the first server VM from performing a storage request from the client VM. In block 706, the application activates, at the second server VM, the logical volume by causing the second VM to virtualize the logical volume in the read/write mode, allowing the second server VM to perform the storage request. In block 708, the application instantiates a third VM virtualizing the logical volume in a read-only mode. Then the application ends.

Figure 8:
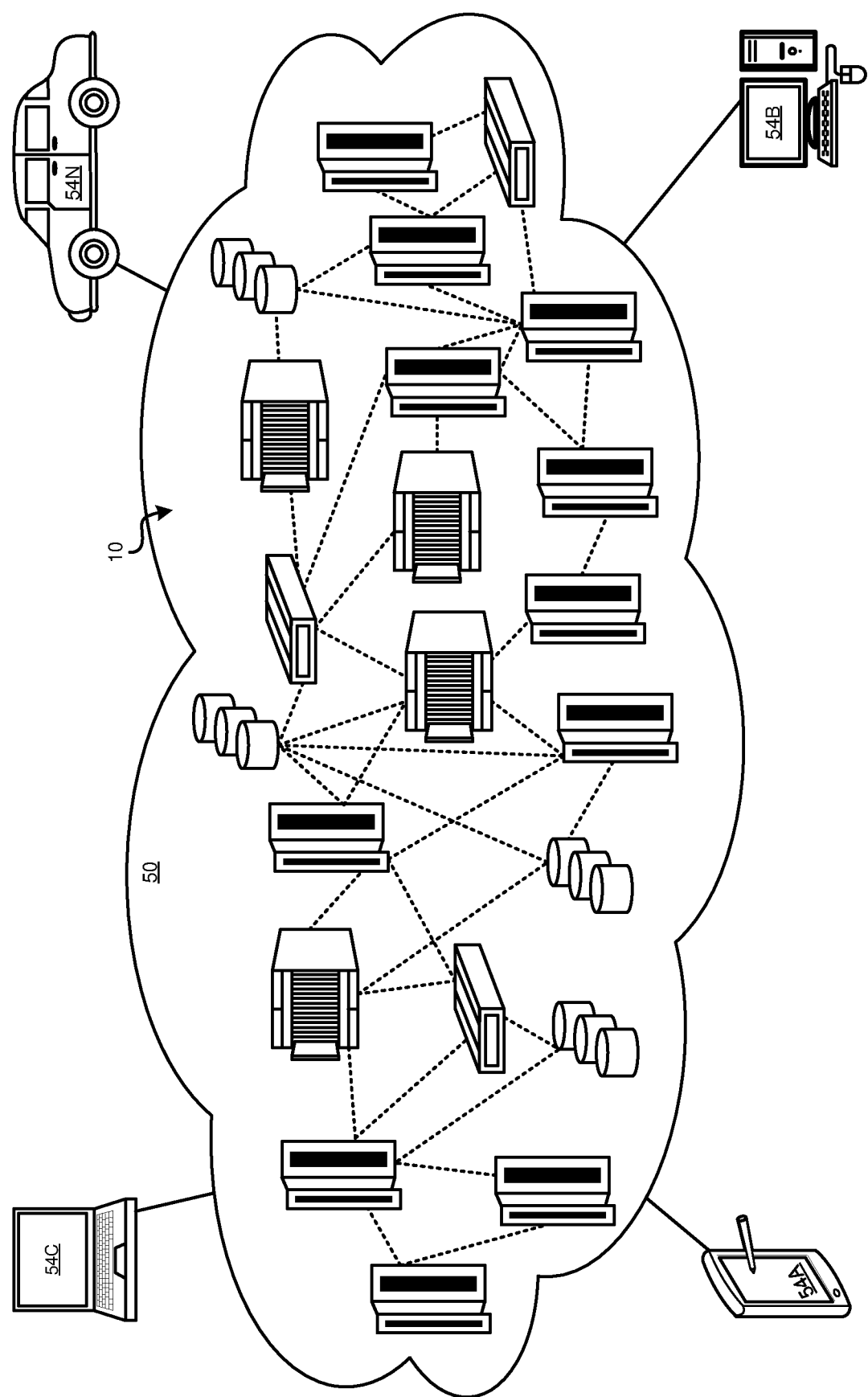
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
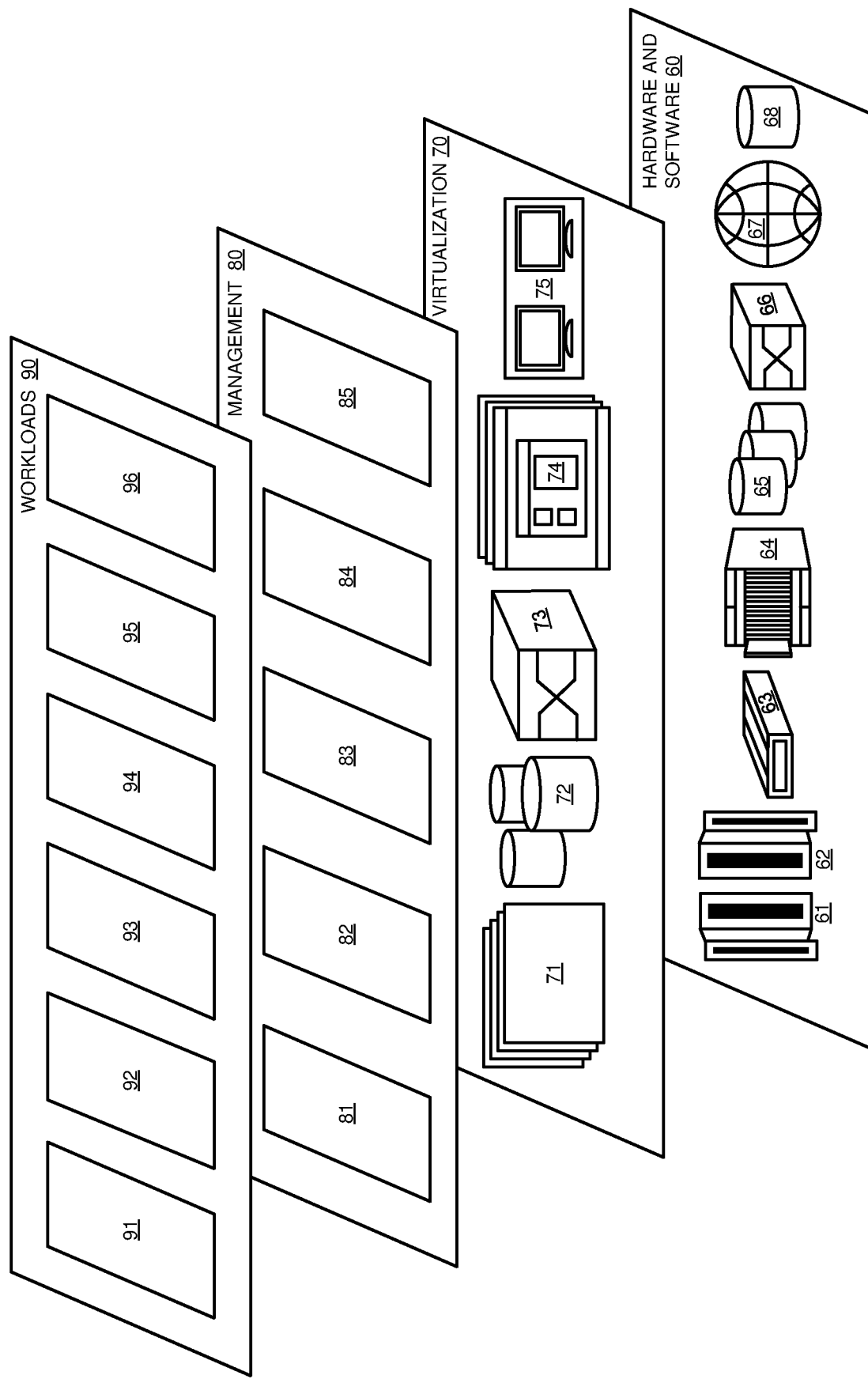
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for live migration and redundancy for virtualized storage and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   instantiating, for a first server virtual machine (VM) virtualizing a logical volume in a read/write mode for a client VM, a second server VM virtualizing the logical volume in an off mode, the logical volume comprising a virtualization of a portion of physical storage;
   deactivating, at the first server VM, the logical volume, the deactivating disallowing the first server VM from performing a storage request from the client VM; and
   activating, at the second server VM, the logical volume, the activating performed by causing the second VM to virtualize the logical volume in the read/write mode, the activating allowing the second server VM to perform the storage request.

2. The computer-implemented method of claim 1, wherein the first server VM executes on a first physical machine, the second server VM executes on a second physical machine, and the portion of physical storage is shared by the first physical machine and the second physical machine.

3. The computer-implemented method of claim 1, wherein the deactivating comprises causing the first server VM to virtualize the logical volume in the off mode.

4. The computer-implemented method of claim 1, wherein the deactivating comprises causing the first server VM to virtualize the logical volume in a read-only mode.

5. The computer-implemented method of claim 1, further comprising:
   instantiating a third VM virtualizing the logical volume in a read-only mode.

6. The computer-implemented method of claim 1, further comprising:
   deactivating, from virtualizing the first portion of the physical storage, the first server VM.

7. The computer-implemented method of claim 5, wherein the second server VM virtualizes a second logical volume in the read/write mode for a second client VM and the third server VM virtualizes the second logical volume in the read-only mode for the second client VM, the second logical volume comprising a virtualization of a second portion of the physical storage.

8. A computer program product for live migration for virtualized storage, the computer program product comprising:
   one or more computer readable storage media, and program instructions collectively stored on the one or more computer readable storage media, the stored program instructions comprising:
   program instructions to instantiate, for a first server virtual machine (VM) virtualizing a logical volume in a read/write mode for a client VM, a second server VM virtualizing the logical volume in an off mode, the logical volume comprising a virtualization of a portion of physical storage;
   program instructions to deactivate, at the first server VM, the logical volume, the deactivating disallowing the first server VM from performing a storage request from the client VM; and program instructions to activate, at the second server VM, the logical volume, the activating performed by causing the second VM to virtualize the logical volume in the read/write mode, the activating allowing the second server VM to perform the storage request.

9. The computer program product of claim 8, wherein the first VM executes on a first physical machine, the second VM executes on a second physical machine, and the first portion of physical storage is shared by the first physical machine and the second physical machine.

10. The computer program product of claim 8, wherein the deactivating comprises causing the first VM to virtualize the logical volume in the off mode.

11. The computer program product of claim 8, wherein the deactivating comprises causing the first VM to virtualize the logical volume in a read-only mode.

12. The computer program product of claim 8, the stored program instructions further comprising:
   program instructions to instantiate a third VM virtualizing the logical volume in a read-only mode.

13. The computer program product of claim 8, the stored program instructions further comprising:
   program instructions to deactivate, from virtualizing the first portion of the physical storage, the first server VM.

14. The computer program product of claim 12, wherein the second server VM virtualizes a second logical volume in the read/write mode for a second client VM and the third server VM virtualizes the second logical volume in the read-only mode for the second client VM, the second logical volume comprising a virtualization of a second portion of the physical storage.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
   program instructions to instantiate, for a first server virtual machine (VM) virtualizing a logical volume in a read/write mode for a client VM, a second server VM virtualizing the logical volume in an off mode, the logical volume comprising a virtualization of a portion of physical storage;
   program instructions to deactivate, at the first server VM, the logical volume, the deactivating disallowing the first server VM from performing a storage request from the client VM; and
   program instructions to activate, at the second server VM, the logical volume, the activating performed by causing the second VM to virtualize the logical volume in the read/write mode, the activating allowing the second server VM to perform the storage request.

19. The computer system of claim 18, wherein the first VM executes on a first physical machine, the second VM executes on a second physical machine, and the first portion of physical storage is shared by the first physical machine and the second physical machine.

20. The computer system of claim 18, wherein the deactivating comprises causing the first VM to virtualize the logical volume in the off mode.

* * * * *